Sept. 2, 1952　　　　C. E. KLEIBER　　　　2,609,248
APPARATUS FOR HANDLING FINELY DIVIDED SOLID MATERIALS Filed March 13, 1948　　　　　　　　　　　2 SHEETS—SHEET 1

Carl E. Kleiber Inventor
By W. O. T. Hilman Attorney

Sept. 2, 1952   C. E. KLEIBER   2,609,248
APPARATUS FOR HANDLING FINELY DIVIDED SOLID MATERIALS
Filed March 13, 1948   2 SHEETS—SHEET 2

Carl E. Kleiber Inventor
By W. O. T. Heilman Attorney

UNITED STATES PATENT OFFICE 2,609,248

APPARATUS FOR HANDLING FINELY DIVIDED SOLID MATERIALS

Carl E. Kleiber, Irvington, N. J., assignor to Standard Oil Development Company, a corporation of Delaware Application March 13, 1948, Serial No. 14,764

4 Claims. (Cl. 302—36)

The present invention relates to an apparatus for handling finely divided solid materials. More particularly the invention relates to improvements in means for introducing such materials into a flowing stream of a fluid material for transportation in a treating or handling system, or for initiating a treating step in such system. It is an object of the invention to provide a means for accomplishing the most efficient dispersion of the finely divided solid material in the flowing stream of fluid, avoiding undue accumulation of the solid material at the point of introduction. It is a further object of the invention is to provide a method and means for utilizing the kinetic energy, or inertia, of a moving mass of finely divided solid material, to facilitate dispersion of such material in a flowing stream of a fluid material.

In the service contemplated, as for example in the catalytic cracking of hydrocarbons, large quantities of finely divided solid catalyst materials are required to be handled. It is customary to handle these materials in a fluidized form by the injection of gaseous or liquid materials into a mass of the powdered material, or by injection and dispersion of the powdered materials into a flowing stream of fluids. By varying the density of the dispersion of solids in the fluid material, differential pressures are obtained which aid in movement of the solid materials through the system, for example, where a mass of finely divided solid material having a density of from about 25 to 50 lbs. per cubic foot may be injected into a stream of fluid flowing through a conduit under a pressure of from about 10 to 25 lbs. per square inch to form a dispersion of catalyst material therein having a density of from about 1 to 1½ lbs. per cubic foot. Under such conditions, introduction of the powdered solid material may be accomplished by gravity from a vertical standpipe or conduit opening freely into a conduit of larger volume through which is passed a stream of a fluid material.

It has been found that when operating in such manner the inertia of the mass of solid material issuing from the open end of the stand-pipe into the larger transfer conduit tends to pass through the fluid stream without being completely dispersed therein, and to form a compacted deposit on the lower inside surface of the transfer conduit. This may result in erratic operation of the entire system, and definitely reduces the efficiency of the operation in many ways. Settling of the powdered solid in the transfer conduit may cause excessive vibration of the piping system; localized erosion, due to undesirable deflection of the fluid stream by the settled material; pressure surges in the conduit system and related equipment, and due to the insulation effect of the settled catalyst, to the development of temperature differentials in the conduit elements with consequent unequalized stresses produced within and between elements. These undesirable conditions result in a general and extensive impairment of overall operating efficiency, and directly influence both operating and construction costs. It is a specific object of the invention to avoid such conditions by providing means to accomplish more uniform and more efficient dispersion of the finely divided solid materials in the stream of fluid into which such materials are introduced.

The invention and its objects may be more fully understood from the following description when it is read in conjunction with the accompanying drawings, in which.

Figure 1:
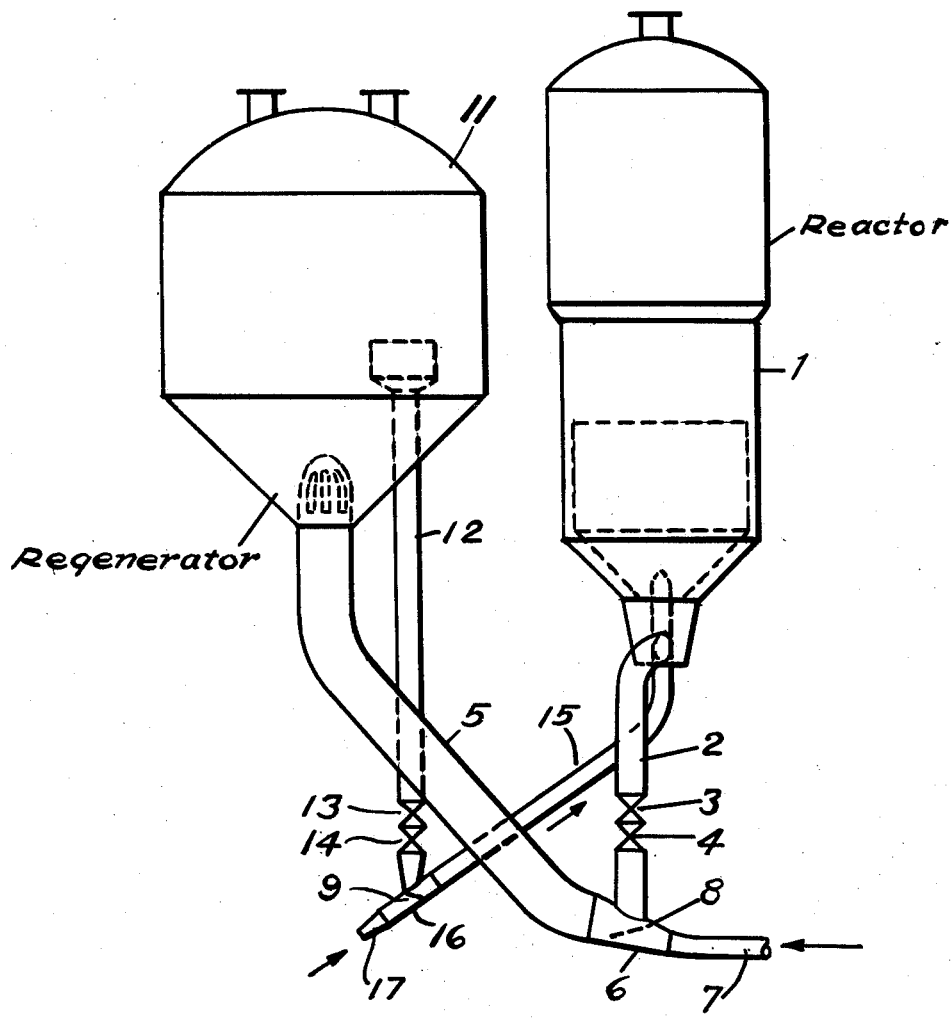
Fig. 1 is a schematic showing of the invention in the environment of interconnected reactor and regenerator equipment of a catalytic cracking system.

Referring more particularly to the drawings, in the apparatus illustrated by Fig. 1, the numeral I designates a reactor unit and the numeral II a regenerator unit, both of which are parts of a system for cracking hydrocarbons in the presence of a finely divided or powdered solid catalyst material.

Contaminated or spent catalyst material may be withdrawn from the reactor I as by line or draw-off conduit 2, in which are disposed dual control valves 3 and 4. The conduit 2 usually is in the nature of a stand-pipe, filled with a dense mass of at least partially fluidized finely divided material, which discharges into transfer line or conduit 5 by way of an injector connection 6. A fluid material, such as the air which may be utilized in the regeneration step, may be introduced through the injector 6 as by conduit 7, rearwardly or upstream from the inlet of conduit 5. This fluid material may be supplied by pumping, if a liquid, or from a compressor or blower, if a gas or vapor. The fluid material so introduced is utilized to reduce the density of the mass of powdered material which is discharged from the conduit 2 and dispersed in the fluid material, and such dispersion with reduction in density, plus the energy of the flowing stream of fluid moves the fluidized solid material through conduit 6 into the regenerator 11. Likewise the regenerated finely divided solid material may be withdrawn from regenerator 11 as by the line or draw-off conduit 12, in which are disposed dual control valves 13 and 14, and returned to the reactor 1 by way of a transfer conduit 15. The conduit 12, also in the nature of a stand-pipe, is normally filled with a dense column of solid material and discharges into the conduit 15 by way of an injector element or connection 16. A fluid material, ordinarily the reactant material, is fed through the element 16 as by conduit 17.

It has been found that the inertia of the mass of finely divided solid material moving through the conduit or stand-pipes 2 or 12 and discharging into the elements 6 and 16, tends to resist the dispersing effect of the stream of fluid from conduits 7 and 17 to the extent that the solid material is deposited on the lower inside surface of the connections 6 and 16, and the conduits 5 and 15. To overcome this undesirable condition, according to the present invention a distributor element 8 is disposed in the injectors 6 and 16 at the point of injection of the solid material, to intercept the flow of such material from the conduits 2 and 12 into the injectors 6 and 16 respectively, utilizing the inertia of the high density mass to change the direction of flow, and to aid in dispersion in the stream of fluid material.

Figure 2:
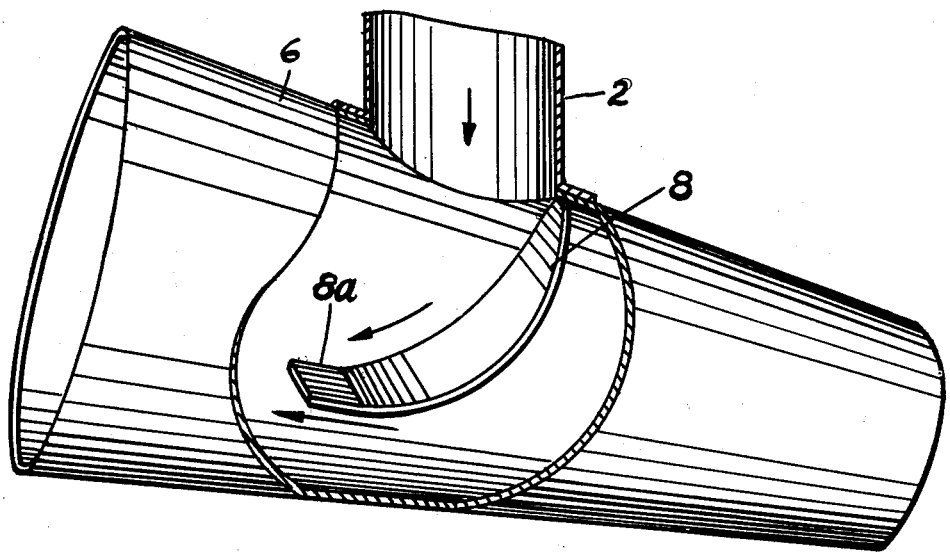
Fig. 2 is a perspective view of a portion of the apparatus shown in Fig. 1, with parts broken away.

The element 8 is shown in Fig. 2 in the form of a longitudinal section of a cylinder disposed laterally of an injector 6 in substantially tangential relation to the upstream wall of a conduit 2, with the ends and upper edge portions conformed to the shape of the injector 6 where they are in contact, and in substantially fluid tight relation thereto. Preferably, the radius of curvature of the element 8 is greater than that of the conduit or stand-pipe 2, and the center of curvature is disposed eccentrically with reference to the stand-pipe 2 and injector 6. In such manner, the lower edge of the element 8 is disposed laterally of the injector in a plane below the center line of the injector 6 and conduit 5. A substantially flat lip 8a may be provided on the lower edge of the element 8, extending downstream in a plane substantially parallel with one laterally through the center line of injector 6, and in substantially tangential relation to element 8. It is preferred that the lip 8a extend somewhat beyond the entrance of the stand-pipe 2 into the injector connection 6.

Figure 3:
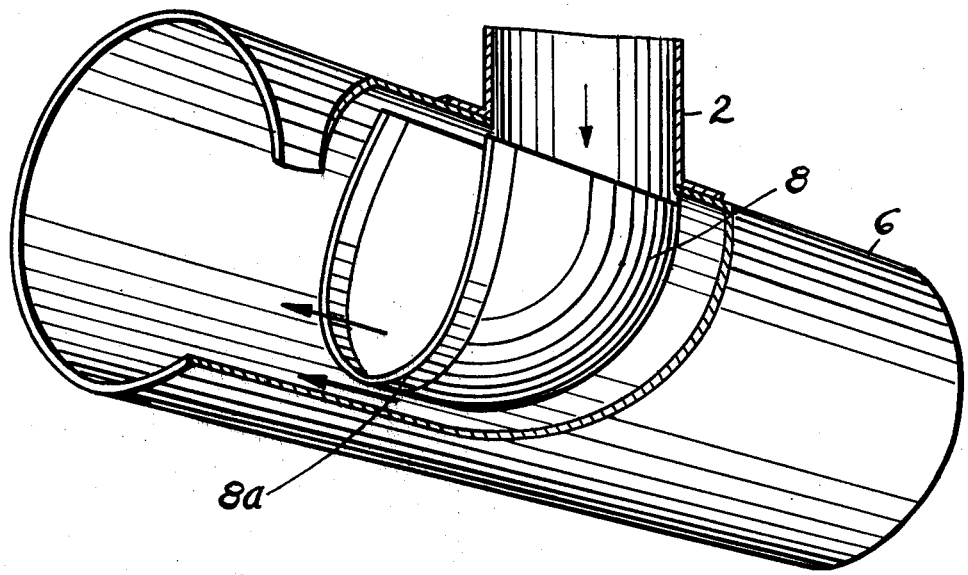
Fig. 3 is a similar view of another form of the invention.

In the structure illustrated by Fig. 3, the distributor element 8 is in the approximate form of a quarter section vertically through a hollow, substantially spheroidal body. This section provides a distributor element having U-shaped edge portions in substantially right angular relation secured by one edge portion to the upper wall of the connection 6 or 16 so as to substantially enclose the end of conduit 2 or 12 at its upstream entrance into connection 6 or 16. In this form the lip 8a is a flat strip, deformed to produce a generally U-shaped member of which a substantial portion lies below a plane laterally through the center line of the connection 6 or 16. Other forms of distributor elements may be used as for example a segment of an annulus of semi-circular cross section, or an element approximating the conformation of a section of a sphere.

In operation, a finely divided solid material is introduced into the injector 6 or 16 as a high density stream from the inlet opening of conduit 2 or 12, while a fluid material is supplied through line 7 or 17. The stream of solid material entering the injector connections 6 or 16 impinges upon the distributor element 8, and the inertia or kinetic energy of the moving stream forcibly deflects the mass of solid particles in the direction of desired flow. At the same time, the moving stream of fluid from the line 7 or 17 passes into the injector 6 or 16, where its velocity is increased by the constriction of the deflector element. The mass of solid material leaving the conduit 2 or 12 tends to retain the shape thereof as would a stream of liquid. Upon contact with the distributor element, this conformation of the stream of solid material is changed thereby and substantially spread over a greater surface in the enlarged injector connection, somewhat dispersing the mass of solid materials before contact with the flowing stream of fluid from the line 7 or 17. The combination of high fluid velocity at the deflector lip with directional injection of the mass of finely divided solid material results in rapid and more uniform dispersion of the solid material in the moving stream of fluid, and minimizes settling of the solid materials at the injection point.

The invention has been set forth with particular reference to its application in connection with the injection and transfer of catalyst materials from a reactor unit to a regenerator unit, and vice versa, in a catalytic cracking system only for the purpose of illustration. It is equally as applicable to the handling of similar materials in any process or apparatus employing the fluidized solids technique, including ore reduction, cement making, et cetera, and it is not intended that the scope of the invention be limited otherwise than by the appended claims.

I claim:

1. An apparatus for discharging a high density mass of finely divided solid material into a flowing stream of a fluid material, comprising a conduit injector member having an outlet and an inlet to said member for a fluid material, a conduit element for finely divided solid material having a discharge end portion opening directly into said injector member and secured thereto in fluid-tight relation intermediate the outlet thereof and said inlet for fluid material, said portion having an upstream edge and a downstream edge relative to fluid flow through said injector member, a distributor element internally of said injector member, at least one edge portion of said element conformed to the inner wall surface of said injector member and secured thereto in fluid-tight relation independently of said conduit discharge end portion, said element extending from a point adjacent the upstream edge of said discharge portion downwardly and longitudinally therefrom toward the outlet of said injector member and terminating in a substantially free edge portion beyond the downstream edge of said conduit element discharge end portion shielding said end portion and constricting fluid flow through the injector member.

2. Apparatus according to claim 1, in which said distributor element is a longitudinal section of a cylinder disposed laterally of the injector member, the upper and end edge portions thereof conforming to and secured in fluid tight relation to the side walls of said injector element.

3. Apparatus according to claim 2, in which the free edge portion of the distributor element is supplemented by a substantially flat lip extension piece joined at one side to the free edge of said distributor element and at the ends to the injector walls.

4. Apparatus according to claim 1, in which said distributor member is approximately a quarter section vertically through a hollow spheroidal body secured by one edge portion to the upper wall of the conduit injector element and partially enclosing the inlet for solid materials in the direction of said inlet for fluid material.

CARL E. KLEIBER.

REFERENCES CITED

The following references are of record in the file of this patent:

UNITED STATES PATENTS

| Number | Name | Date |
| --- | --- | --- |
| 301,513 | Newton | July 8, 1884 |
| 321,573 | Boschke | July 7, 1885 |
| 759,750 | Rosenthal | May 10, 1904 |
| 1,086,964 | White | Feb. 10, 1914 |
| 1,614,770 | Ayling | Jan. 18, 1927 |
| 1,618,155 | Thomas et al. | Feb. 15, 1927 |

FOREIGN PATENTS

| Number | Country | Date |
| --- | --- | --- |
| 209,602 | Great Britain | Jan. 17, 1924 |